United States Patent [19]

Dziark

[11] Patent Number: 4,489,200

[45] Date of Patent: Dec. 18, 1984

[54] ONE-COMPONENT RTV SILICONE RUBBER COMPOSITIONS WITH GOOD SELF-BONDING PROPERTIES TO ACRYLATE PLASTICS

[75] Inventor: John J. Dziark, Ballston Spa, N.Y.

[73] Assignee: General Electric Company, Waterford, N.Y.

[21] Appl. No.: 483,969

[22] Filed: Apr. 11, 1983

[51] Int. Cl.$^3$ .............................................. C08G 77/06
[52] U.S. Cl. ...................................... 528/18; 528/33; 528/34; 528/901
[58] Field of Search ...................... 528/18, 33, 34, 901

[56] References Cited

U.S. PATENT DOCUMENTS

| | | | |
|---|---|---|---|
| 4,308,372 | 12/1981 | Smith, Jr. et al. | 528/901 |
| 4,395,526 | 7/1983 | White et al. | 528/18 |
| 4,417,042 | 11/1983 | Dziark | 528/18 |

Primary Examiner—Melvyn I. Marquis

[57] ABSTRACT

The present invention relates to an alkoxy-functional one-component RTV silicone rubber composition with improved adhesion to polyacrylate plastics. The improved adhesion is obtained by utilizing in the composition a pre-reacted mixture having therein the adhesion promoter, silane scavenger and tin condensation catalyst. Optionally there may also be in the mixture, a polyalkoxysilane cross-linking agent.

15 Claims, No Drawings

ONE-COMPONENT RTV SILICONE RUBBER COMPOSITIONS WITH GOOD SELF-BONDING PROPERTIES TO ACRYLATE PLASTICS

BACKGROUND OF THE INVENTION

The present invention relates to alkoxy-functional one-component RTV compositions and more particularly, the present invention relates to alkoxy-functional one-component RTV compositions having novel scavengers therein and which have good self-bonding properties.

Alkoxy-functional one-component RTV compositions have been known for some time, see, for instance, BEERS, U.S. Pat. No. 4,100,129. The compositions of the above patent comprise basically a silanol-terminated diorganopolysiloxane polymer, a polyalkoxy-functional silane cross-linking agent and a titanium chelate catalyst as the condensation catalyst. In addition, these compositions comprise various other additives such as fillers, etc. The compositions of the foregoing U.S. Pat. No. 4,100,129 were commercially practical in that they had a shelf-stability of 1 year or more and a commercially acceptable cure rate after that period of storage. However, there were problems experienced with such compositions from batch to batch and from time to time with respect to such shelf-stability and cure rate; that is, in some batches it was found that the cure rate and shelf-stability was not commercially acceptable. Various attempts were made to solve these problems, which attempts were not altogether successful.

Recently there has been devised an alkoxy-functional one-component RTV silicone rubber composition with improved shelf-stability and cure rate over the compositions of BEERS, U.S. Pat. No. 4,100,129 and other prior art compositions, see, for instance, WHITE, et al, U.S. Pat. No. 4,395,526. This patent application discloses a silanol-terminated diorganopolysiloxane base polymer with optionally, a polyalkoxy cross-linking agent, a condensation catalyst and either a pure scavenger or an integrated cross-linker, scavenger having various functionalities which can be utilized to scavenge unbonded hydroxy groups in the composition. As hypothesized in WHITE, et al, U.S. PAT. No. 4,395,526, it was the presence of unbonded hydroxy groups in the prior alkoxy-functional one-component RTV silicone rubber compositions (hereinafter room temperature vulcanizable shall be referred to as RTV) that resulted in the degradation of shelf-stability and in the cure rate of such compositions.

As pointed out in the WHITE, et al, patent the unbonded hydroxy groups would attack and degrade the alkoxy groups on the terminal silicon atoms of the base diorganopolysiloxane polymer. This resulted in the degradation of the shelf-stability and cure rate of the composition. Accordingly, it was the improvement of WHITE, et al, to include certain scavengers in the composition having certain functional groups which would react with the unbonded hydroxy groups such that they could not attack and degrade the alkoxy groups on the base polymer. Accordingly, the resulting compositions have improved shelf-stability and cure rate. One such composition is to be found, for instance, disclosed in DZIARK, U.S. Pat. No. 4,417,042, which comprises the use of certain silazanes and amino-functional siloxanes as pure scavenging compounds for alkoxy-terminated diorganopolysiloxane polymers. It should be noted that the function of the silazane is purely as a scavenging compound to react with unbonded hydroxy groups in the composition. Such a composition is prepared by reacting the silanol terminated diorganopolysiloxane polymer with a polyalkoxysilane cross-linking agent, such as methyltrimethoxysilane, and then once the end-capped polymer is formed, then the scavenging compound is added thereto. It is also disclosed in that patent application as well as in BEERS, Ser. No. 349,537, now abandoned, and LUCAS, Ser. No. 349,538, both of which were filed Feb. 17, 1982, that various adhesion promoters may be added to these compositions to make them self-bonding, that is so that the compositions will bond to various substrates without the use of a primer. All the patents and patent applications referred to in this application are incorporated by reference. However, even with such self-bonding additives in such compositions, it was found that such compositions would not adhere very well to polyacrylate plastics.

One of the main uses of one-component RTV silicone rubber compositions is as sealants and particularly as glazing sealants in the construction industry. Accordingly, it is highly desirable if alkoxy-functional one-component RTV compositions are devised or developed such as those in the foregoing WHITE, et al, and DZIARK that are useful as glazing sealants. It is also necessary to point out that many of the plastic windows in highrise buildings are fabricated out of polyacrylate plastic. Accordingly, it is necessary to produce an alkoxy-functional one-component RTV silicone rubber composition which can be utilized as a glazing sealant for polyacrylate plastic windows without the need to use therewith a primer.

Further, shelf-stable, acyloxy-functional one-component RTV silicone rubber compositions are known as disclosed in SMITH, et al, U.S. Pat. No. 4,308,372. This patent discloses that the shelf-stability of such acyloxy-functional one-component RTV silicone rubber compositions is improved by pre-reacting the adhesion promoter with the acyloxy-functional cross-linking agent with or without the condensation catalyst. This effect was also noted for the shelf-stability of dimedone-functional one-component RTV silicone rubber composition disclosed in the patent of DZIARK, et al, U.S. Pat. No. 4,395,507. However, the above patents do not appear to disclose that the self-bonding adhesion of their compositions was improved by the foregoing pre-reaction of the cross-linking agent with the condensation catalyst and the adhesion promoter.

Accordingly, it is one object of the present invention to provide for an alkoxy-functional one-component RTV silicone rubber composition with good self-bonding properties to polyacrylate plastics.

It is an additional object of the present invention to provide for an alkoxy-functional one-component RTV silicone rubber composition with good self-bonding properties to various substrates.

It is yet an additional object of the present invention to provide for an alkoxy-functional one-component RTV silicone rubber composition with an improved cure rate and shelf-stability and good self-bonding properties to polyacrylate plastics.

It is still an additional object of the present invention to provide a process for producing an alkoxy-functional one-component RTV silicone rubber composition with good self-bonding properties to polyacrylate plastics.

These and other objects of the present invention are accomplished by means of the disclosure set forth herein below.

SUMMARY OF THE INVENTION

In accordance with the above objects there is provided by the present invention a stable, one-package, substantially anhydrous and substantially acid-free, room temperature vulcanizable organopolysiloxane composition stable under ambient conditions in the substantial absence of moisture over an extended period of time and convertible to a tack-free elastomer with superior adhesion to polyacrylate plastic comprising:

(i) 100 parts by weight of an organopolysiloxane wherein the silicon atom at each polymer chain end is terminated with at least one alkoxy radical; and (ii) a pre reacted catalyst mixture having (1) 0.001 to 10 parts by weight of a tin condensation catalyst;

(2) from 0.5 to 10 parts by weight of silane scavenger for hydroxy-functional groups which is a silicon-nitrogen compound selected from the class consisting of (A) a silicon-nitrogen compound having the formula

where Y is selected from R''' and $R_2''N$— and (B) a silicon-nitrogen polymer comprising (a) from 3 to 100 mole percent chemically combined structural units selected from the class consisting of units having the formula

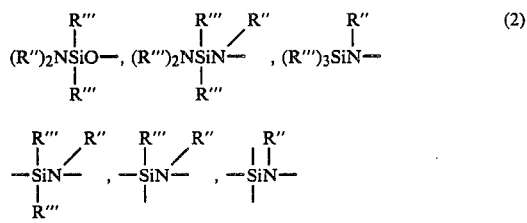

and (b) from 0 to 97 mole percent chemically combined structural units represented by the formula

and mixtures thereof where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazy unit are joined to a member selected from an R'' radical and $(R'')_2N$ radical, and where the ratio of the sum of said R''' radicals and said $(R'')_2N$ radicals to the silicon atoms of said silicon-nitrogen polymer has a value of 1.5 to 3, inclusive, and R'' is a member selected from the class consisting of hydrogen and monovalent hydrocarbon radicals, and fluoroalkyl radicals, R''' is a member selected from hydrogen, monovalent hydrocarbon radicals and fluoroalkyl radicals, and c is a whole number equal to 0 to 3, inclusive and (3) from 0.1 to 10 parts by weight of an adhesion promoter

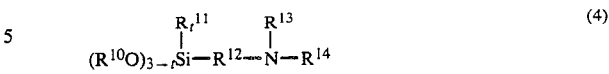

where $R^{10}$, $R^{11}$ are $C_{(1-8)}$ monovalent hydrocarbon radicals, t varies from 0 to 2, $R^{12}$ is a $C_{(2-12)}$ divalent hydrocarbon radical, $R^{13}$, $R^{14}$ are selected from the class consisting of hydrogen, amine radicals, $C_{(1-8)}$ aminefunctional alkyl radicals and $C_{(1-8)}$ monovalent hydrocarbon radicals and mixtures thereof.

It should be pointed out that it is necessary that the basic ingredients of the pre-reacted catalyst mixture comprise the adhesion promoter, the scavenger and the condensation catalyst. The excess polyalkoxysilane cross-linking agent is preferably present but it does not have to be in the mixture. Further, the polyalkoxy cross-linking agent is preferably added to the mixture prior to the pre-reaction but in an alternative embodiment it can be added after the pre-reaction of the catalyst mixture to either the catalyst mixture or it can be added directly to the base polymer.

The preferred ingredients of the instant invention in the catalyst mixture is for the silazane to be hexamethyldisilazane, for the self-bonding additive to be aminoethylaminopropyltrimethoxysilane and for the condensation catalyst to be dibutyltindiacetate. It is not known whether the instant invention would work with other adhesion promoters other than the class defined as set forth in Formula (4) above. Further, it is not known whether the instant invention will operate with scavengers other than the silazane and amino-functional scavengers as set forth above. It is necessary that the condensation catalyst be a tin condensation catalyst and one that is somewhat acidic to obtain the proper inter-reaction between the condensation catalyst, the silazane and amino-functional scavengers and the adhesion promoter.

DESCRIPTION OF THE PREFERRED EMBODIMENT

Per 100 parts of the alkoxy-terminated diorganopolysiloxane, there may be present from 0.001 to 1 part and more generally from 0.001 to 10 parts by weight of a tin condensation catalyst.

There are included tin compounds, for example, dibutyltindilaurate; dibutyltindiacetate; carbomethoxyphenyl tin tris-uberate, tin octoate; isobutyl tin triceroate; dimethyl tin dibutyrate; dimethyl tin dineodeconoate; triethyl tin tartrate; dibutyl tin dibenzoate; tin oleate; tin naphthenate; butyltintri-2ethylhexoate; tinbutyrate. The condensation catalysts are tin compounds and dibutyltindiacetate is particularly preferred.

Preferably there is utilized acidic based tin condensation catalysts such as dibutyltindiacetate. In combination with the foregoing tin condensation catalyst there is preferably utilized from 0.5 to 10 parts by weight of the silicone scavenger for the hydroxy-functional group as defined above. There can be utilized in the instant pre-reacted catalyst mixture a concentration of silicone scavenger which is anywhere from an effective amount up to a maximum of 3 percent more than is needed to react with the unbonded hydroxy groups in the RTV composition mixture as defined in WHITE, et al, U.S. Pat. No. 4,395,526. However, a more preferred range is a concentration of 0.5 to 10 parts by weight of the silane scavenger as defined above per 100 parts of the alkoxy-terminated diorganopolysiloxane polymer. With respect to the silicone scavengers that can be utilized in the instant invention, they are defined in DZIARK, U.S. Pat. No. 4,417,042. Accordingly, there may be used as a scavenger a silicone nitrogen compound selected from the compounds of Formulas (1), (2) or a combination of (2) and (3) above.

Accordingly, the silazane polymers can include cyclics consisting of chemically combined

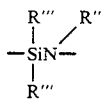

units where R″ and R‴ are as previously defined to provide for a ratio of 1.5 to 3.0 of the sum of the R‴ and R₂″N radicals for silicon atoms in the silazane polymer.

The definition of a silazane polymer includes linear polymers having at least one unit of the class consisting of

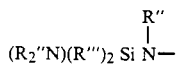

units and

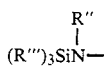

units where R″ and R‴ are as previously defined to provide for a ratio of 1.5 to 3 of the sum of the R‴ and R₂″N radicals per silicon atom in the silazane polymer.

Further silazane polymers which are included within the definition of the above polymers comprise linear polymers consisting essentially of

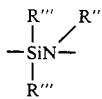

units where R″ and R‴ are defined to provide for a ratio of 1.5 to 3.0 of the sum of R‴ and the R₂″N radicals per silicon atom in the silazane polymer.

In addition, the silazane polymers include polymers having at least one unit selected from the class consisting of

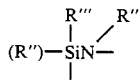

units and

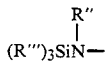

units where R″ and R‴ are as previously defined to provide a ratio of 1.5 to 3 of the sum of the R‴ and R₂″N radicals per silicon atom in the silazane polymer.

In addition the silazane polymers can comprise polymers having a sufficient amount of units selected from

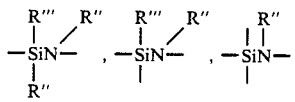

where R″ and R‴, are as previously defined to provide for a ratio of 1.5 to 3 of the sum of the R‴ and R₂″N radicals per silicon atom in the silazane polymer.

The silazane/siloxane copolymers can also be in the form of cyclics and consist of chemically combined R₂‴SiO units and

units where R″ and R‴ are as previously defined.

Linear siloxane copolymers are also included where the mole percent of $$(R''')_cSiO_{(4-c)/2}$$

units can be as high as 97 mole percent with the balance of the units being selected from

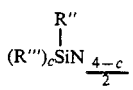

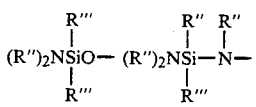

where R″ and R‴ are as previously defined to provide for a ratio of the sum of R‴ and R₂″N radicals per silicon of the siloxane copolymer from 1.5 to 3.

Other linear silazanes that are included within the scope of the above formulas are ones having the formula

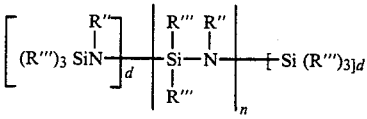

where R″ and R‴ are as previously defined, n is a positive whole number and is preferably from 0 to 20 inclusive, and d is a whole number equal to 0 to 1, inclusive and where d is equal to 0 and n is preferably equal to 3 to 7, inclusive.

Illustrating the silazanes that can be employed in the practice of the present invention within the scope of the above formulas are hexamethyldisilazane, hexamethylcyclotrisilazane, octamethylcyclotetrasilocane, trimethyltriphenylcyclotrisilazane, trivinyltrimethylcyclotrisilazane, etc.

In addition to the silazanes of the above formulas, there is also included polysiloxanes having terminal silylamine units or silazane units as shown by the formula

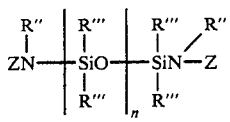

where R″ and R‴ are as defined previously, Z is a member selected from R″ and SiR₃‴, where R″ and R‴ and n are as defined previously.

Other silicone-nitrogen compounds that can be utilized as silane scavenger compounds in the pre-reacted catalyst mixture of the instant invention are, for instance, silyl amines of the formula

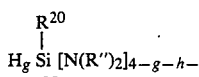

where $R^{20}$ is a radical selected from the class consisting of $C_{(1-8)}$ monovalent hydrocarbon radicals and $C_{(1-8)}$ alkoxy radicals and fluoroalkyl radicals, and R″ is selected from hydrogen and a $C_{(1-8)}$ monovalent hydrocarbon radical, and g is a whole number that varies from 1 to 3, h is a whole number that varies from 0 to 2 and the sum of h+g does not exceed 3. Compounds coming within the scope of the above formula are, for instance, methyl di(methylamino)silane, tris(methylamino)silane, methyl bis(diethylamino)silane.

The presence of such compounds and processes for producing them and their use as scavengers in alkoxy-functional one-component RTV silicone rubber compositions is disclosed in DZIARK, U.S. Pat. No. 4,417,042, which is hereby incorporated by reference.

Another necessary ingredient in the instant composition is from an effective amount and more preferably from 0.1 to 10 parts by weight of an adhesion promoter of Formula (4) above where $R^{10}$, $R^{11}$, $R^{12}$, $R^{13}$, and $R^{14}$ are as defined above.

This class of adhesion promoters are defined in LUCAS, Ser. No. 349,538 filed Feb. 17, 1982. Various quantities of the adhesion promoters can be used from an effective amount up to excess amounts of the adhesion promoter. Generally, it is preferred that they be utilized in the pre-reacted catalyst mixture at a concentration of 0.1 to 10 parts by weight and more preferably 0.1 to 5 parts by weight per 100 parts of the alkoxy-terminated diorganopolysiloxane polymer. The $R^{12}$ radical is selected from divalent hydrocarbon radicals which are substituted or unsubstituted such as alkylene radicals, such as methylene, etc.; and arylene radicals, such as phenylene etc. The $R^{10}$, $R^{11}$, $R^{13}$ and $R^{14}$ radicals are selected from such substituent radicals which are known for such compounds such as alkyl radicals of 1 to 8 carbon atoms, such as methyl, ethyl, etc.; aryl radicals, such as methyl, phenyl, ethylphenyl, etc.; alkaryl radicals as defined above, aralkyl radicals such as pehnylmethyl, phenylethyl and so forth; fluoro-substituted alkyl radicals such as 3,3,3-trifluoropropyl, etc. With respect to the amine radicals, they can be selected from the amine-functional alkyl radicals. Examples of such radicals are aminoethyl, aminopropyl, aminobutyl, etc.

With respect to the silicone scavengers of Formulas (1), (2), and (3) the R″ and R‴ radicals can be selected from the same monovalent hydrocarbon radicals as defined above for the $R^{10}$, $R^{11}$, $R^{12}$, $R^{13}$ radicals. This is also true of the $R^{20}$ radical in Formula (5).

The above quantities and concentrations of the different basic ingredients in the pre-reacted catalyst mixture are the preferred concentrations. As can be envisioned, various changes can be made in the concentrations of one ingredient over the other: that is, it can be increased without deliterious effects but with no great advantage. However, below the above minimum concentrations, the catalyst mixture may not be very effective.

The above are the three necessary ingredients in the pre-reacted catalyst. It also should be pointed out it is not known whether other ingredients, such as other adhesion promoters or other scavengers will work in the instant invention, other than the ones specified above.

As far as forming the pre-reacted catalyst mixture, desirably all the ingredients are mixed together and allowed to react with each other for a period of time varying from 1 hour to 7 days, at a temperature in the range of 25° C. to 150° C. More preferably, the pre-reacted catalyst mixture is pre-reacted at a temperature in the range of 50° C. to 100° C. for a period of time of 1 hour to 4 days. As noted above, the reaction time can be shortened by simply increasing the temperature. It is not desirable to increase the temperature above 150° C. since this may degrade some of the ingredients in the catalyst mixture. On the other hand, if the temperature is lower than 25° C., then the reaction may be too slow to be commercially useful.

It is preferred that the pre-reacted catalyst mixture be reacted under an anhydrous atmosphere or in the substantial absence of moisture. It should be noted that a cross-linking agent is not a necessary ingredient in the pre-reacted catalyst mixture. Further, although it is a preferred ingredient in the composition and in the pre-reacted catalyst mixture, it does not have to be pre-reacted with the catalyst mixture with the other ingredients; that is, the excess cross-linking agent may be added to the pre-reacted mixture and then the entire composition added to the alkoxy-terminated diorganopolysiloxane base polymer.

The excess cross-linking agent is preferably used from an effective amount to up to 10 parts by weight per 100 parts of the alkoxy-terminated diorganopolysiloxane base polymer, more preferably it is utilized at concentrations of 0.1 to 5 parts by weight. It can be utilized from anywhere from 0.1 to more than 10 parts by weight, however, it serves no useful function in large concentrations and below the minimum concentrations it may not have an effect on the composition. The cross-linking agent is preferably one of the formula

$R^1$ and $R^2$ are selected from the same radicals as given above for $R^{10}$ and $R^{11}$ in the above formulas, and b varies from 0 to 2. Preferred polyalkoxy cross-linking agents in the above pre-reacted catalyst mixture are as follows:
vinlytrimethoxysilane
ethyltrimethoxysilane
phenyltrimethoxysilane
dimethyldimethoxysilane
Preferred tin condensation catalysts in the above catalyst mixture are as follows:
dibutyltindiacetate
dimethyltindibutyrate dibutyltindibenzoate Preferred scavengers within the above formulas to be utilized in the instant invention are, for instance:
hexamethyldisilazane
hexamethylcyclotrisilazane
octamethylcyclotetrasilazane
heptamethyldisilazane Preferred adhesion promoters within the above formulas for utilization in the instant invention are, for instance:
aminoethylaminopropyltrimethoxysilane
aminopropyltrimethoxysilane
aminopropyltriethoxysilane For more information as to such adhesion promoters and methods of preparing them, one is referred to the patent application of Gary M. Lucas, Ser. No. 349,538, filed Feb. 17, 1982.

For the base polymer that is utilized in the basic invention there is preferably used a silanol-terminated polydiorganosiloxane having the formula

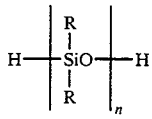
(7)

where R is a $C_{(1-13)}$ monovalent substituted or unsubstituted hydrocarbon radical which is preferably methyl or a mixture of a major amount of methyl and a minor amount of phenylcyanoethyl, trifluoropropyl, vinyl and mixtures thereof and n is an integer having a value of from about 50 to 2500. Preferably the silanol-terminated polymer of the above formula has a viscosity in the range of 100 to about 400,000 centipoise and more preferably has a viscosity in the range of about 1,000 to about 250,000 centipoise when measured at about 25° C. Preferably "n" in the above formulas varies from 500 to 2,000.

The base alkoxy-terminated diorganopolysiloxane polymer is produced by reacting the silanol-terminated diorganopolysiloxane polymer of Formula (7) above with the polyalkoxysilane of Formula (6) above in the presence of an end-capping catalyst as defined in WHITE, et al, U.S. Pat. No. 4,395,526, or as defined in CHUNG, Ser. No. 427,930, filed Sept. 29, 1982, now abandoned. Once these two ingredients are reacted together, there is preferably formed a polyalkoxy-terminated diorganopolysiloxane polymer of the formula,

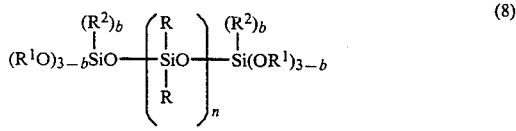
(8)

where R, $R^1$, $R^2$, and n are as previously defined and b is 0 or up to 2. Such an alkoxy-terminated diorganopolysiloxane polymer is partially defined in WHITE, et al, U.S. Pat. No. 4,395,526, more fully defined in LUCAS, Ser. No. 449,105, filed Dec. 13, 1982.

Such a polymer can be either mono or polyalkoxy-terminated. If it is polyalkoxy-terminated then it can be used as the base polymer without any change. However, if it is monoalkoxy-terminated, then as pointed out in LUCAS, Ser. No 449,105, filed Dec. 13, 1982 the base polymer mixture can only be up to 50 parts by weight of such monoalkoxy-terminated polymer. The rest of the base polymer mixture has to be comprised of a polyalkoxy-terminated polymer in order for the composition to have the desired physical properties and cure rate. Further, the base polymer composition can comprise other monoalkoxy-terminated diorganopolysiloxane polymers in which there are functional groups on the terminal silicon atom, such as, for instance, amido, cyclic amido, amino, aminosiloxane, carbamato, enoxy, imidato, isocyanato, oximato, thioicyanato and ureido as set forth, in WHITE, et al, U.S. Pat. No. 4,395,526, DZIARK U.S. Pat. No. 4,417,042 BEERS Ser. No. 349,537, filed Feb. 17, 1982, now abandoned, and LUCAS, Ser. No. 446,233, filed Dec. 12, 1982 and LUCAS, Ser. No. 449,105, filed Dec. 13, 1982.

To such base polymers there may be added, once they have been formed, the pre-reacted catalyst mixture of the instant case to form a shelf-stable alkoxy-functional one-component RTV composition with superior self-bonding adhesion to polyacrylate plastics. It is not known whether the composition has superior adhesion to other types of plastics other than polyacrylate. However, it is suspected that it does have this superior self-bonding adhesion to other plastics as compared to the compositions of BEERS, Ser. No. 349,537, filed Feb. 17, 1982, now abandoned, LUCAS, Ser. No. 349,538, filed Feb. 17, 1982.

Radicals included within the R of the above formulas are, for example, aryl radicals and halogenated aryl radicals, such as phenyl, tolyl, chlorophenyl, naphthyl; aliphatic and cycloaliphatic radicals, for example, cyclohexyl, cyclobutyl, alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included with $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example, 2-acetoxyethyl; alkylketone radicals, for example, 1-butan-3-onyl; alkylcyano radicals, for example 2-cyanoethyl. Radicals included within $R^2$ are the same or different radicals included within R radicals. In the above formulas where R, $R^1$ and $R^2$ can be more than one radical, these radicals can be the same or different.

In the foregoing above formulas, R'', R''', $R^{10}$, $R^{11}$, $R^{13}$, $R^{14}$, and $B^{20}$ can be selected from the same radicals as given above for R, $R^1$, and $R^2$ and in the same formula or compound the radicals can be the same or different.

Finally there may be added other ingredients in the composition such as fillers.

Various fillers and pigments can be incorporated in the alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of fillers used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of a filler, which can include up to about 25 parts of a reinforcing filler such as fumed silica filler, per 100 parts of a silanol-terminated organopolysiloxane is utilized.

There may also be added various plasticizers and adhesion promoters, sag control agents, additives and so forth and other additives as disclosed in the foregoing dockets of BEERS, Ser. No. 349,537, now abandoned, and including additional adhesion promoters as disclosed in LUCAS, Ser. No. 349,538, both filed Feb. 17, 1982.

The composition is prepared by taking the silanol-terminated diorganopolysiloxane polymer and reacting it with the polyalkoxy-silane of Formula (6) above in the presence of an end-coupling catalyst to produce the polyalkoxy-terminated diorganopolysiloxane of Formula (8) above. Once this polymer is prepared, then there is added to it a silicone scavenger. Then there is further added to it the other additives, and finally the pre-reacted catalyst mixture which is produced as defined above. The composition is then stored in the substantial absence of moisture and when it is desired to cure the composition, the seal on the package is broken and the composition exposed to atmospheric moisture whereupon it will cure, with final cure taking place within a period of time varying from 24 hours to 72 hours.

It must be emphasized again that the purpose of the pre-reacted catalyst mixture in the instant invention is to increase adhesion to polyacrylate plastics and not for the purpose of enhancing shelf-stability of the composition.

There may also be present a cure accelerator in the composition. It has been further found that improved cure rates can be achieved if minor amounts of amines, substituted guanidines, or mixtures thereof, are utilized as curing accelerators in the polyalkoxy compositions of the present invention. There can be used from 0.1 to 5 parts and preferably from about 0.3 to 1 part of curing accelerator, per 100 parts of the silanol-terminated polymer of Formula (7), or 100 parts of the alkoxy-terminated polymer of Formula (8) to substantially reduce the tack-free time (TFT) of the RTV composition of the present invention. This enhanced cure rate is maintained after it has been aged for an extended shelf period, for example, 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediately exposed to atmospheric moisture.

Among the curing accelerators which can be used in the practice of the invention are silyl substituted guanidines having the formula,

  (9)

where $R^1$ is as previously defined, Z is a guanidine radical of the formula,

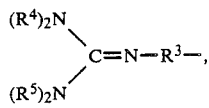

$R^3$ is divalent $C_{(2-8)}$ alkylene radical, $R^4$ and $R^5$ are selected from hydrogen and $C_{(1-8)}$ alkyl radicals and g is an integer equal to 1 to 3 inclusive. In addition, alkyl substituted guanidines having the formula,

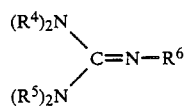

where $R^4$ and $R^5$ are as previously defined and $R^6$ is a $C_{(1-8)}$ alkyl radical, also can be employed. Some of the silyl substituted guanidines included within Formula (9) are shown by TAKAGO, U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine, and silylated amines, for example, aminopropyltrimethoxysilane and methyldimethoxy di-n-hexylaminosilane. Methyldimethoxy-di-n-hexylaminosilane acts as both a scavenger and curing accelerator. The primary amines, secondary amines, silylated secondary amines are preferred and secondary amines, and silylated secondary amines are particularly preferred. Silylated secondary amines such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

It appears that the curing accelerators described herein, in addition to decreasing the tack-free times of the RTV compositions of this invention, also provide a surprising stabilizing effect for particular RTV compositions catalyzed with certain condensation catalysts which exhibit a marked lengthening of tack-free time after accelerated aging. For this class of condensation catalysts, addition of amines, substituted guanidines and mixtures thereof described herein provide stable RTV compositions which exhibit a fast cure rate initially, i.e., less than about 30 minutes which remains substantially unchanged after accelerated aging. The cure accelerator is optional in the instant invention.

In one embodiment, a particular preferred mixture in accordance with the instant invention is, for instance, a stable and substantially acid-free, one-package, room temperature vulcanizable polyalkoxy-terminated organopolysiloxane composition curable under ambient conditions to a tack-free elastomer over an extended period of time with improved adhesion to polyacrylate plastics comprising on a weight basis (i) 100 parts of a substantially silanol-free polyalkoxy siloxydiorganopolysiloxane of the formula

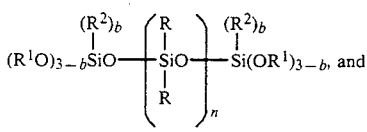

(ii) a pre-reacted catalyst mixture having
(1) 0.1 to 10 parts of a cross-linking polyalkoxy silane of the formula

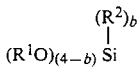

(2) from 0.001 to 10 parts of a tin condensation catalyst,
(3) from 0.5 to 10 parts of a stabilizing amount of a silane scavenger selected from
(A) a silicon-nitrogen compound having the formula

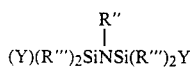

where Y is selected from $R'''$ and $R_2''N-$ and
(B) a silicon-nitrogen polymer comprising
(1) from 3 to 100 mole percent chemically combined structural units selected from the class consisting of units having the formula

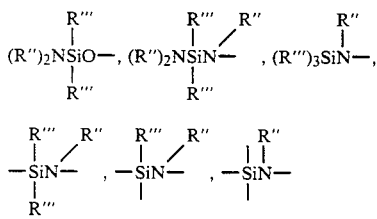

and (2) from 0 to 97 mole percent chemically combined structural units represented by the formula

and mixtures thereof where the silicon atoms of said silicon-nitrogen polymer are joined to each other by a member selected from an SiOSi linkage and a $SiNR''Si$ linkage, the free valences of said silicon atoms other than those joined to oxygen to form a siloxy unit and nitrogen to form a silazy unit are joined to a member selected from an $R''$ radical and $(R''')_2N$ radical, and where the ratio of the sum of said $R'''$ radical and $(R''')_2N$ radicals to the silicon atoms of said silicon-nitrogen polymer has a value of 1.5 to 3, inclusive, where $R''$ is a member selected from the class consisting of hydrogen and monovalent hydrocarbon radicals, and fluoroalkyl radicals, $R'''$ is a member selected from hydrogen, monovalent hydrocarbon radicals and fluoroalkyl radicals, and c is a whole number equal to 0 to 3, inclusive, where R is a $C_{(1-13)}$ monovalent substituted or unsubstituted hydrocarbon radical, $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, and b is a whole number equal to 0 or 2, and n is an integer having a value of from about 50 to 2500 inclusive;
(4) from 0.1 to 10 parts by weight of an adhesion promoter

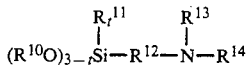

where $R^{10}$, $R^{11}$ are $C_{(1-8)}$ monovalent hydrocarbon radicals, t varies from 0 to 2, $R^{12}$ is a $C_{(2-12)}$ divalent hydrocarbon radical, $R^{13}$, $R^{14}$ are selected from the class consisting of hydrogen, amine radicals, $C_{(1-8)}$ aminofunctional alkyl radicals and $C_{(1-8)}$ monovalent hydrocarbon radicals and mixtures thereof, and
(iii) optionally, 0.1 to 5 parts of a curing accelerator selected from the group consisting of substituted guanidines, amines and mixtures thereof.

Various changes can be made in the methods of mixing the composition or in the mixture itself by adding various ingredients. All such changes are within the ability of a worker skilled in the art as taught by the present disclosure.

The Examples below are given for the purpose of illustrating the present invention. They are not given for the purpose of setting limits and boundaries to the invention. All parts in the Example are by weight.

EXAMPLE I

There was prepared a base methyldimethoxy-capped polydimethylsiloxane polymer containing 0.6 parts of di-n-hexylamine by reacting methyltrimethoxysilane with a silanol end-stopped dimethylpolysiloxane polymer having a viscosity in the range of 100,000 centipoise at 25° C in the presence of 0.6 parts of di-n-hexylamine. To 100 parts of such base polymer which contained the 0.6 parts of di-n-hexylamine, there was added 17 parts of octamethylcyclotetrasiloxane treated fumed silica, 10 parts of an oil containing 3 mole percent of trimethylsiloxy units, 77 mole percent of dimethylsiloxy units and 20 mole percent of monomethylsiloxy units which had 0.5 weight percent of silanol. To this mixture there was added 35 parts by weight of a trimethylsiloxy end-stopped dimethylpolysiloxane polymer having 500–1500 parts of silanol in it and having 100 centipoise viscosity at 25° C. Then, there was added 0.2 parts by weight of UCON LB 1145 which is a tradename of a polyether manufactured by Union Carbide Corporation. To 100 parts of the above base composition, there was added 4.15 parts of a fresh catalyst solution which was prepared by mixing one part of methyltrimethoxysilane, 2 parts by weight of hexamethyldisilazane, 1 part of aminoethylaminopropyltrimethoxysilane and 0.15 parts of dibutyltindiacetate.

After the composition was mixed, peel adhesion samples were prepared and allowed to cure for 10 days at 50 percent relative humidity and at 75° F. The peel adhesion results from the tests of these samples that were prepared from the above composition are as follows:

TABLE I

| Substrate | Peel Adhesion ppi (% Cohesive Failure) |
|---|---|
| Polyacrylate | 12(0) |
| Anodized aluminum | 52(100) |

EXAMPLE II

To 100 parts by weight of the base composition that was prepared in Example I, there was added 4.15 parts by weight of the catalyst solution described in Example I. However, in this instance, before addition, the catalyst solution was aged or allowed to pre-react for 4 days at 50° C. In Example I, the catalyst solution was not allowed to pre-react but was added almost as soon as it was formed. Again, peel adhesion specimens were prepared and aged 10 days at 50 percent relative humidity and at 75° F. temperature. The results are set forth in Table II.

TABLE II

| Substrate | Peel Adhesion ppi (% Cohesive Failure) |
|---|---|
| Polyacrylate | 50(100) |
| Anodized aluminum | 46(100) |

As the results of Examples I and II indicate, the pre-reacted catalyst mixture resulted in an alkoxy-functional RTV composition which had a much better self-bonding adhesion to polyacrylate plastics as compared to the composition containing the unreacted catalyst mixture.

What we claim is:

1. A stable, one-package substantially anhydrous and substantially acid-free, room temperature vulcanizable organopolysiloxane composition stable under ambient conditions in the substantial absence of moisture over an extended period of time and convertible to a tack-free elastomer having superior adhesion to polyacrylate plastic comprising:

(i) 100 parts by weight base alkoxy-terminated diorganopolysiloxane comprising up to 50 parts by weight monoalkoxy-terminated diorganopolysiloxane and at least 50 parts by weight polyalkoxy-terminated diorganopolysiloxane; and (ii) a pre-reacted catalyst mixture comprising the reaction product of (1) 0.001 to 10 parts by weight per 100 parts by weight of (i) of a tin condensation catalyst, (2) 0.5 to 10 parts by weight per 100 parts by weight of (i) of a scavenger for hydroxy functional groups which is a silicon-nitrogen compound selected from the group consisting of (A) a silicon-nitrogen compound having the formula

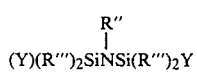

where Y is selected from R''' and (R'')$_2$N and (B) a silicon-nitrogen polymer comprising (i) from 3 to 100 mole percent chemically combined structural units of the formula

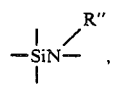

and (ii) from 0 to 97 mole percent chemically combined structural units represented by the formula

where the silicon atoms of said compound are joined to each other by a member selected from an SiOSi linkage and a SiNR''Si linkage, the free valences of said silicon atoms other than those joined to oxygen to form a siloxy unit or to nitrogen to form a silazy unit are joined to a member selected from an R''' radical and an (R'')$_2$N radical, where the ratio of the sum of said R''' radicals and said (R'')$_2$N radicals to the silicon atoms of said polymer has a value of 1.5 to 3 inclusive, R'' and R''' are independently selected from the group consisting of hydrogen, monovalent hydrocarbon radicals and monovalent fluoroalkyl radicals, and c is a whole number equal to 0 to 3 inclusive, and (3) 0.1 to 10 parts by weight per 100 parts by weight of (i) of an adhesion promoter having the formula

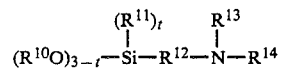

where $R^{10}$ and $R^{11}$ are $C_{(1-8)}$ monovalent hydrocarbon radicals, t varies from 0 to 2, $R^{12}$ is a $C_{(2-12)}$ divalent hydrocarbon radical, $R^{13}$ and $R^{14}$ are selected from the group consisting of hydrogen, amine radicals, $C_{(1-8)}$ aminofunctional alkyl radicals and $C_{(1-8)}$ monovalent hydrocarbon radicals, and mixtures thereof.

2. The composition of claim 1 wherein the pre-reacted catalyst mixture (ii) is prepared by reacting components (ii) (1), (ii) (2) and (ii) (3) at a temperature varying from 25° C. to 100° C. for a period of time varying from 1 hour to 7 days.

3. The composition of claim 1 wherein the pre-reacted catalyst mixture (ii) is prepared by reacting components (ii) (1), (ii) (2) and (ii) (3) at a temperature varying from 50° C. to 100° C. for a period of time varying from 1 hour to 4 days.

4. The composition of claim 1 wherein component (ii) (2) is hexamethyldisilazane.

5. The composition of claim 1 wherein component (ii) (3) is aminoethylaminopropyltrimethyloxysilane.

6. The composition of claim 1 wherein component (ii) (1) is dibutyltindiacetate.

7. The composition of claim 1 wherein the pre-reacted catalyst mixture (ii) further comprises 0.1 to 10 parts by weight of crosslinking agent of the formula,

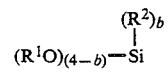

where $R^1$ is a $C_{(1-8)}$ aliphatic organic radical selected from the group consisting of alkyl, alkylether, alkylester, alkylketone and alkylcyano radicals or a $C_{(7-13)}$ aralkyl radical, $R^2$ is a $C_{(1-13)}$ monovalent substituted or unsubstituted hydrocarbon radical, and b is a whole number equal to 0 to 2.

8. The composition of claim 1, further comprising: (iii) an effective amount of curing accelerator selected from the group consisting of substituted guanidines, amines and mixtures thereof.

9. A stable, one-package, substantially anhydrous and substantially acid-free, room temperature vulcanizable organopolysiloxane composition stable under ambient conditions in the substantial absence of moisture over an extended period of time and convertible to a tack-free elastomer having superior adhesion to polyacrylate plastic comprising:
(i) 100 parts by weight base alkoxy-terminated diorganopolysiloxane comprising up to 50 parts by weight monoalkoxy-terminated diorganopolysiloxane and at least 50 parts by weight polyalkoxy-terminated diorganopolysiloxane; and
(ii) a pre-reacted catalyst mixture comprising the reaction product of
(1) 0.001 to 10 parts by weight of (i) of a tin condensation catalyst,
(2) 0.5 to 10 parts by weight per 100 parts by weight of (i) of a scavenger for hydroxy functional groups which is a silyl amine of the formula

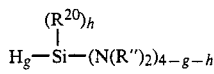
$$H_g-Si-(N(R'')_2)_{4-g-h}$$
with $(R^{20})_h$ above Si where $R^{20}$ is selected from the group consisting of $C_{(1-8)}$ monovalent hydrocarbon radicals, $C_{(1-8)}$ monovalent alkoxy radicals and $C_{(1-8)}$ monovalent fluoroalkyl radicals, R'' is selected from the group consisting of hydrogen and $C_{(1-8)}$ monovalent hydrocarbon radicals, g is a whole number that varies from 1 to 3, h is a whole number that varies from 0 to 2, and the sum of h+g does not exceed 3,
(3) 0.1 to 10 parts by weight of (i) of an adhesion promoter having the formula

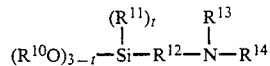
$$(R^{10}O)_{3-t}-Si-R^{12}-N-R^{14}$$
with $(R^{11})_t$ above Si and $R^{13}$ above N where $R^{10}$ and $R^{11}$ are $C_{(1-8)}$ monovalent hydrocarbon radicals, t varies from 0 to 2, $R^{12}$ is a $C_{(2-12)}$ divalent hydrocarbon radical, $R^{13}$ and $R^{14}$ are selected from the group consisting of hydrogen, amine radicals, $C_{(1-8)}$ aminofunctional alkyl radicals and $C_{(1-8)}$ monovalent hydrocarbon radicals and mixtures thereof.

10. The composition of claim 9 wherein the pre-reacted catalyst mixture (ii) is prepared by reacting components (ii) (1), (ii) (2) and (ii) (3) at a temperature varying from 25° C. to 100° C. for a period of time varying from 1 hour to 7 days.

11. The composition of claim 9 wherein the pre-reacted catalyst mixture (ii) is prepared by reacting components (ii) (1), (ii) (2) and (ii) (3) at a temperature varying from 50° C. for a period of time varying from 1 hour to 4 days.

12. The composition of claim 9, wherein component (ii) (3) is aminoethylaminopropyltrimethoxysilane.

13. The composition of claim 9 wherein component (ii) (1) is dibutyltindiacetate.

14. The composition of claim 9 wherein the pre-reacted catalyst mixture (ii) further comprises 0.1 to 10 parts by weight of crosslinking agent of the formula

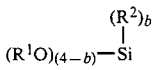
$$(R^1O)_{(4-b)}-Si$$
with $(R^2)_b$ above Si where $R^1$ is a $C_{(1-8)}$ aliphatic organic radical selected from the group consisting of alkyl, alkylether, alkylester, alkylketone and alkylcyano radicals or a $C_{(7-13)}$ aralkyl radical, $R^2$ is a $C_{(1-13)}$ monovalent substituted or unsubstituted hydrocarbon radical, and b is a whole number equal to 0 to 2.

15. The composition of claim 9, further comprising: (iii) an effective amount of curing accelerator selected from the group consisting of substituted guanidines, amines and mixtures thereof.

* * * * *